United States Patent
Price

(10) Patent No.: US 7,038,787 B2
(45) Date of Patent: May 2, 2006

(54) CONTENT-BASED FUSED OFF-AXIS OBJECT ILLUMINATION DIRECT-TO-DIGITAL HOLOGRAPHY

(75) Inventor: Jeffery R. Price, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 426 days.

(21) Appl. No.: 10/234,043

(22) Filed: Sep. 3, 2002

(65) Prior Publication Data

US 2004/0042015 A1 Mar. 4, 2004

(51) Int. Cl.
*G01B 9/02* (2006.01)

(52) U.S. Cl. .......................... 356/484; 359/32
(58) Field of Classification Search ................ 356/457, 356/458, 484–490, 508, 510; 359/9–11, 29, 359/32, 33
See application file for complete search history.

(56) References Cited

U.S. PATENT DOCUMENTS 6,078,392 A * 6/2000 Thomas et al. ............. 356/457
6,262,818 B1 * 7/2001 Cuche et al. ................... 359/9

FOREIGN PATENT DOCUMENTS

WO    WO 01/50201 A1    7/2001

OTHER PUBLICATIONS

Vishnyakov et al., "Optico–Physical Measurements Linnik Tomographic Microscope for Investigation of Optically Transparent Objects," Measurement Techniques, vol. 41, No. 18, Oct. 1998, pp. 906–911.

Reynolds et al., "Holographic Fringe Linearization Interferometry for Defect Detection," Optical Engineering, vol. 24, No. 5, Oct. 1985, pp. 757–768.

International Search Report dated Mar. 4, 2004, issued in corresponding international application No. PCT/US03/27574.

Hecht, "OPTICS" Third Edition, Adelphi University, published by Addison–Wesley Longman, Inc., pp. 465–469 and 599–602.

Price, "Off-axis Illumination to Improve DDH Imaging Resolution," Image Science and Machine Vision Group, Oak Ridge National Laboratory, pp. 1–38.

* cited by examiner

*Primary Examiner*—Andrew H. Lee
(74) *Attorney, Agent, or Firm*—John Bruckner PC

(57) ABSTRACT

Systems and methods are described for content-based fused off-axis illumination direct-to-digital holography. A method includes calculating an illumination angle with respect to an optical axis defined by a focusing lens as a function of data representing a Fourier analyzed spatially heterodyne hologram; reflecting a reference beam from a reference mirror at a non-normal angle; reflecting an object beam from an object the object beam incident upon the object at the illumination angle; focusing the reference beam and the object beam at a focal plane of a digital recorder to from the content-based off-axis illuminated spatially heterodyne hologram including spatially heterodyne fringes for Fourier analysis; and digitally recording the content based off-axis illuminated spatially heterodyne hologram including spatially heterodyne fringes for Fourier analysis.

24 Claims, 2 Drawing Sheets

CONTENT-BASED FUSED OFF-AXIS OBJECT ILLUMINATION DIRECT-TO-DIGITAL HOLOGRAPHY

STATEMENT AS TO RIGHTS TO INVENTIONS MADE UNDER FEDERALLY-SPONSORED RESEARCH OR DEVELOPMENT

This invention was made with United States Government support under prime contract No. DE-AC05-00OR22725 to UT-Battelle, L.L.C. awarded by the Department of Energy. The Government has certain rights in this invention.

BACKGROUND OF THE INVENTION

1. Field of the Invention

The invention relates generally to the field of direct-to-digital holography (interferometry). More particularly, the invention relates to content-based off-axis Illumination for direct-to-digital holography.

2. Discussion of the Related Art

Prior art direct-to-digital holography (DDH), sometimes called direct-to-digital interferometry, is known to those skilled in the art. For instance, FIG. 1 illustrates one simplified embodiment of a DDH system. Light from a laser source 105 is expanded by a beam expander/spatial filter 110 and then travels through a lens 115. Subsequently, the expanded filtered light travels to a beamsplitter 120. The beamsplitter 120 may be partially reflective. The portion of light reflected from the beamsplitter 120 constitutes an object beam 125 which travels to the object 130. The portion of the object beam 125 that is reflected by the object 130 then passes through the beamsplitter 120 and travels to a focusing lens 145. This light then passes through the focusing lens 145 and travels to a charge coupled device (CCD) camera (not shown).

The portion of the light from the lens 115 that passes through the beamsplitter 120 constitutes a reference beam 135. The reference beam 135 is reflected from a mirror 140 at a small angle. The reflected reference beam 135 from the mirror then travels toward the beamsplitter 120. The portion of the reference beam 135 that is reflected from the beamsplitter 120 then travels through the focusing lens 145 and toward the CCD camera (not shown). The object beam 125 from the focusing lens 145 and the reference beam 135 from the focusing lens 145 constitute a plurality of object and reference waves 150 and will interfere at the CCD to produce the interference pattern characteristic of a hologram as noted in U.S. Pat. No. 6,078,392.

In FIG. 1, the object beam 125 is parallel to, and coincident with, the optical axis 127. This type of DDH set-up can be referred to as on-axis illumination.

A limitation of this technology has been that the imaging resolution of the DDH system is limited by the optics of the system. The most notable limitation of the optics is the aperture stop, which is required to prevent degradation of the image quality due to aberrations. With regard to a two-dimensional Fourier plane, only object spatial frequencies within a circle of radius q0 can be transmitted. In the case of on-axis illumination, the aperture with radius q0 appears centered on a zero spatial frequency (q=0). What is needed, therefore, is an approach that permits spatial frequencies outside the circle of radius q0 to be transmitted.

SUMMARY OF THE INVENTION

There is a need for the following aspects of the invention. Of course, the invention is not limited to these aspects.

According to an aspect of the invention, a process comprises: calculating an illumination angle with respect to an optical axis defined by a focusing lens as a function of data representing a Fourier analyzed spatially heterodyne hologram; recording a content based spatially heterodyne hologram including spatially heterodyne fringes for Fourier analysis; Fourier analyzing the recorded content based spatially heterodyne hologram including spatially heterodyne fringes by transforming axes of the recorded content based spatially heterodyne hologram including spatially heterodyne fringes in Fourier space to sit on top of a heterodyne carrier frequency defined as an angle between the reference beam and the object beam; applying a digital filter to cut off signals around an original origin; and then performing an inverse Fourier transform.

According to another aspect of the invention, a machine comprises: an interferometer that records a content based spatially heterodyne hologram including spatially heterodyne fringes for Fourier analysis including a focusing lens; a digital recorder coupled to the interferometer; and a computer that calculates an illumination angle with respect to an optical axis defined by the focusing lens as a function of data representing a Fourier analyzed spatially heterodyne hologram.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 1:
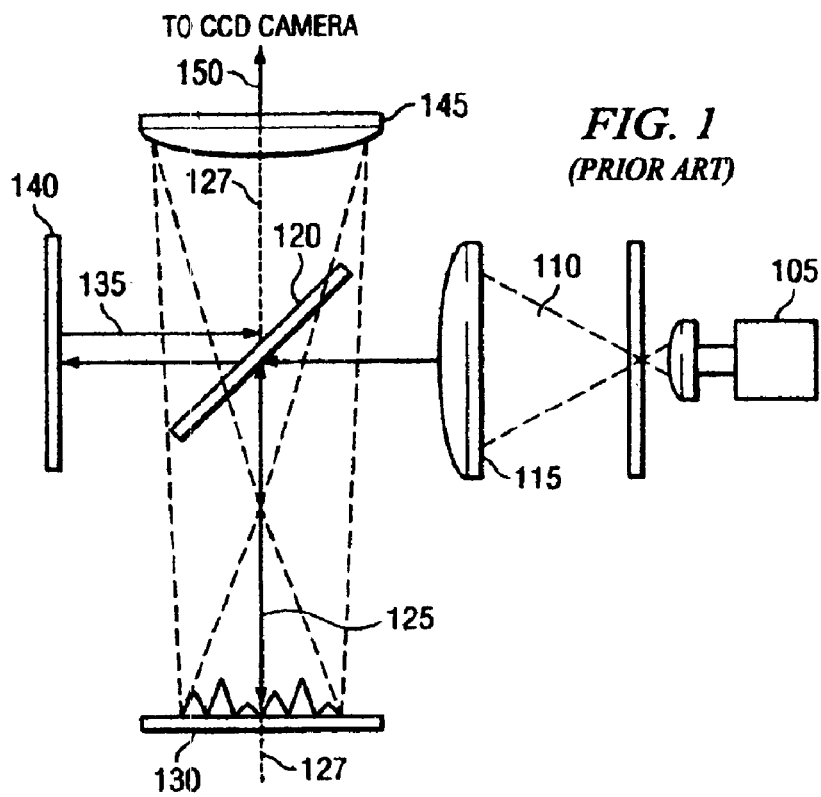
FIG. 1 illustrates a schematic view of a conventional direct-to-digital holography apparatus, appropriately labeled "PRIOR ART."

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Within this application several publications are referenced by Arabic numerals within parentheses. Full citations for these, and other, publications may be found at the end of the specification immediately preceding the claims after the section heading References. The disclosures of all these publications in their entireties are hereby expressly incorporated by reference herein for the purpose of indicating the background of the invention and illustrating the state of the art.

The below-referenced U.S. patents, and allowed U.S. patent Application, disclose embodiments that were satisfactory for the purposes for which they are intended. The entire contents of U.S. Pat. No. 6,078,392, issued Jun. 20, 2000 to C. E. Thomas, L. R. Baylor, G. R. Hanson, D. A. Rasmussen, E. VoelkI, J. Castracane, M. Simkulet and L. Clow, entitled "Direct-to-Digital Holography and Holovision" are hereby expressly incorporated by reference herein for all purposes. The entire contents of allowed U.S. patent application Ser. No. 09/477,267, filed Jan. 4, 2000 by C. E. Thomas and G. R. Hanson, entitled "Improvements To Acquisition and Replay Systems" are hereby expressly incorporated by reference herein for all purposes.

This application contains disclosure that also contained in copending U.S. Ser. No. 10/234,044 filed Sep. 3, 2002, now U.S. Pat. No. 6,747,771, issued Jun. 3, 2004; and Ser. No. 10/234,042,filed Sep. 3, 2002, the entire contents of all of which are hereby expressly incorporated by reference for all purposes.

In general, the context of the invention can include obtaining, storing and/or replaying digital data. The context of the invention can include processing digital data that represents an image. The context of the invention can also include transforming data from multiple images into a merged image.

The invention can include a method of acquiring improved resolution holographic imagery from a direct-to-digital holography system using off-axis illumination. The invention can also include an apparatus for acquiring improved resolution holographic imagery with a direct-to-digital holography (DDH) system that uses off-axis illumination.

In general, the object to be observed (imaged) is optically coupled to an illumination source via one or more optical components. As discussed with regard to FIG. 1, the illumination beam is typically passed through the center of the target objective (i.e., lens system) along, and thus parallel to, the optical axis. This type of DDH configuration can be referred to as "on-axis illumination" and allows spatial frequencies (q) of the object to be acquired up to a certain limit (q0), which is determined by the objective aperture.

The invention can include an "off-axis illumination" scenario, where the illumination source is displaced laterally so that the beam will pass through the object objective off-center yet still parallel to the optical axis. The illumination will, due to the focusing effect of the objective, be incident upon the object at some angle to the optical axis. Due to this off-axis illumination, higher spatial frequencies (q>q0) of the object can pass through the objective aperture, and thus be observed, than can with on-axis illumination. This is an important advantage of the invention.

The invention can include an extended DDH system (apparatus) adapted to digitally capture the on-axis- and one, or more, off-axis-illuminated holograms of the same object. The invention can also include analyzing and/or processing (fusing) the digitally captured data. The resulting, fused image will contain a wider range of spatial frequencies than in any of the original holograms, thus providing a significant increase in the nominal imaging resolution of the system compared to the case where no off-axis-illuminated data is available.

As noted above, the imaging resolution of fundamental DDH systems is limited by the optics, most notably the aperture stop, which is required to prevent degradation of the image quality due to aberrations. The aperture stop is required to prevent aliasing of higher frequencies and subsequent degradation of imaging quality. This means the optics of the DDH system are such that only object spatial frequencies within a circle of radius q0 can be transmitted. In the case of on-axis illumination, the aperture with radius q0 appears centered on a zero spatial frequency (q=0). In the case of off-axis illumination, the aperture with radius q0 appears shifted (e.g., to the left) in the frequency domain. This implies that in the direction in which the aperture is shifted, spatial frequencies with q>q0 are transmitted. On the downside, some spatial frequencies with q close to q0 are "lost" in the opposite direction. By acquiring a second image with the illumination shifted in the opposite direction, the aperture appears shifted (e.g., to the right) and thus the spatial frequencies "lost" from the first image are regained with additional frequencies beyond q0. Fusing the information from the two images results in one image with better resolution. Since DDH records the phase information on the complex image wave, the information from both (or more) images can be fused with surprisingly advantageous results. The invention improves the resolution of generic object structures regardless of orientation.

The invention can include an extension of the fundamental DDH system to automatically capture both on-axis and off-axis illuminated holograms. The invention can also include methods to analyze and fuse the results of these holograms to produce a representation of the observed object with more spatial resolution than available in the prior DDH art.

As evident in FIG. 1, the object beam 125 is parallel to the optical axis 127. As noted above, this set-up can be referred to as on-axis illumination. Off-axis illumination, on the other hand, refers to the case where the object beam 125 is incident upon the object 130 at some angle with respect to the optical axis 127 (an example is illustrated by the object team 215,305 shown in FIG. 3). There are many methods to achieve off-axis illumination; the approach presented hereafter is intended to serve only as a representative, and therefore non-limiting example.

Figure 2:
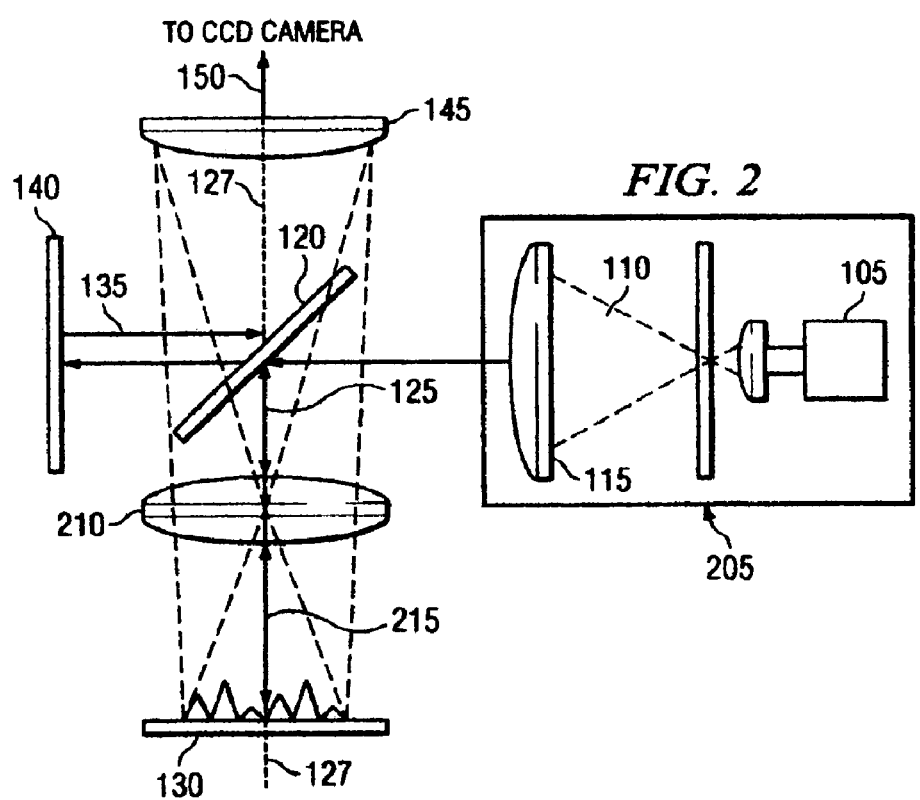
FIG. 2 illustrates a schematic view of an off-axis illumination direct-to-digital holography apparatus (interferometer) in an on-axis position, representing an embodiment of the invention.
Figure 3:
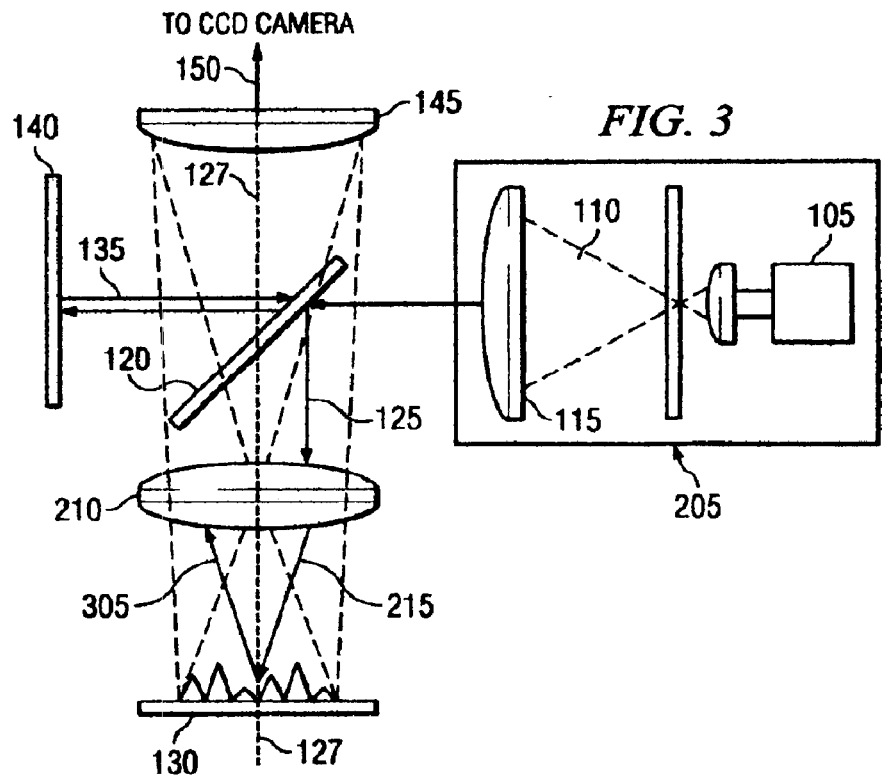
FIG. 3 illustrates a schematic view of the off-axis illumination direct-to-digital holography apparatus (interferometer) of FIG. 2 in an off-axis position.

Referring to FIGS. 2 and 3, an embodiment of an off-axis illumination DDH apparatus is illustrated. In FIGS. 2 and 3, there are two primary modifications from FIG. 1. A first modification is that the laser source 105, the beam expander/spatial filter 110, and the lens 115 are grouped into a computer-controlled, moveable enclosure 205. The enclosure 205 can be movable along an axis that is substantially parallel to the optical axis 127. In more detail, the enclosure 205 can be movable along an axis that is substantially coplanar with a normal to the beamsplitter 120.

Still referring to FIGS. 2 and 3, a second modification is the addition of the object objective 210. In FIG. 2, the laser source enclosure 205 is positioned so that the object beam 125 reflects off of the beamsplitter 120 to pass through the center of the object objective 210. The object beam 125 then leaves the object objective 210 and is incident upon the object 130, centered around the optical axis 127. In this configuration, on-axis illumination is achieved and the system of FIG. 2 is effectively the same as that in FIG. 1.

In FIG. 3, however, the laser source enclosure 205 is shifted (up in this particular configuration) so that the object beam 125 passes through the object objective 210 off-center. Of course, the laser source enclosure 205 can alternatively be shifted down. Because of the focusing properties of the object objective 210, the object beam 215 leaving the object objective 210 is incident upon the object 130 at some angle with respect to the optical axis 127, thereby achieving off-axis illumination. Thus, the object beam 215 can be incident upon the object 130 substantially non-parallel to the optic axis 127. The object beam 305 reflected from the object passes back through the object objective 210 off-axis, but due to the optical properties of the object objective 210 and the focusing lens 150 is still focused on the CCD (not shown). In the off-axis illumination case, the properties of diffraction[1] imply that the hologram formed at the CCD by the interference of the object beam 305 and the reference beam 135 will contain some spatial frequencies of the object that are not observed using on-axis illumination.

Thus, the invention can include an apparatus operable to digitally record a spatially heterodyne hologram including spatially heterodyne fringes for Fourier analysis, comprising: a laser; a beamsplitter optically coupled to the laser; a reference beam mirror optically coupled to the beamsplitter; an object optically coupled to the beamsplitter; a focusing lens optically coupled to both the reference beam mirror and the object; a digital recorder optically coupled to the focusing lens; and a computer for performing a Fourier transform, applying a digital filter, and performing an inverse Fourier transform, wherein a reference beam is incident upon the reference beam mirror at a non-normal angle, an object beam is incident upon the object at an angle with respect to an optical axis defined by the focusing lens, the reference beam and an object beam, which constitute a plurality of simultaneous reference and object waves, are focused by the focusing lens at a focal plane of the digital recorder to form a spatially heterodyne hologram including spatially heterodyne fringes for Fourier analysis which is recorded by the digital recorder, and the computer transforms axes of the recorded spatially heterodyne hologram including spatially heterodyne fringes in Fourier space to sit on top of a heterodyne carrier frequency defined by an angle between the reference beam and the object beam and cuts off signals around an original origin before performing the inverse Fourier transform. The apparatus can include an object objective optically coupled between the beamsplitter and the object. The apparatus can include an aperture stop coupled between the object and the focusing lens. The beamsplitter, the reference beam mirror and the digital recorder can define a Michelson geometry. The beamsplitter, the reference beam mirror and the digital recorder can define a Mach-Zehner geometry. The apparatus can also include a digital storage medium coupled to the computer for performing a Fourier transform, applying a digital filter, and performing an inverse Fourier transform. The digital recorder can include a CCD camera 350 that defines pixels. The apparatus can include a beam expander/spatial filter 230 optically coupled between the laser and the beamsplitter. The angle between the reference beam and the object beam, and a magnification provided by the focusing lens, can be selected in order that the digital recorder may resolve features of the spatially heterodyne hologram including spatially heterodyne fringes for Fourier analysis. So that the digital recorder may resolve a feature, two fringes, each having two pixels per fringe, can be provided. The invention can include a spatially heterodyne hologram produced by the above-described apparatus, embodied on a computer-readable medium.

Accordingly, the invention can include a method of recording a spatially heterodyne hologram including spatially heterodyne fringes for Fourier analysis, comprising: splitting a laser beam into a reference beam and an object beam; reflecting the reference beam from a reference mirror at a non-normal angle; reflecting the object beam from an object at an angle with respect to an optical axis defined by a focusing lens; focusing the reference beam and the object beam, which constitute a plurality of simultaneous reference and object waves, with the focusing lens at a focal plane of a digital recorder to form a spatially heterodyne hologram including spatially heterodyne fringes for Fourier analysis; digitally recording the spatially heterodyne hologram including spatially heterodyne fringes for Fourier analysis; Fourier analyzing the recorded spatially heterodyne hologram including spatially heterodyne fringes by transforming axes of the recorded spatially heterodyne hologram including spatially heterodyne fringes in Fourier space to sit on top of a heterodyne carrier frequency defined as an angle between the reference beam and the object beam; applying a digital filter to cut off signals around an original origin; and then performing an inverse Fourier transform. The method can include diffracting the object beam with an object objective before reflecting the object beam from an object at an angle with respect to an optical axis defined by a focusing lens and after reflecting the object beam from an object at an angle with respect to an optical axis defined by a focusing lens. The step of transforming axes of the recorded spatially heterodyne hologram can include transforming with an extended Fourier transform. The step of digitally recording can include detecting the beams with a CCD camera that defines pixels. The off-axis illuminated spatially heterodyne hologram can be an off-axis illuminated spatially low-frequency heterodyne hologram; the phrase low-frequency implies that the fundamental fringe spatial frequency is below the Nyquist sampling limit. The method can also include storing the spatially heterodyne hologram including spatially heterodyne fringes for Fourier analysis as digital data. The method can also include replaying the Fourier analyzed spatially heterodyne hologram. The method can also include transmitting the Fourier analyzed spatially heterodyne hologram. The invention can include a spatially heterodyne hologram prepared by the above-described method(s), embodied on a computer-readable medium.

Content Based Fusion

To employ off-axis illumination, certain imaging parameters, such as the off-axis illumination angle and direction, must be set. There is, however, no set of imaging parameters that is optimal for every object, or even for every part of the same object. Illuminating "across" valleys or trenches in an object can cause valuable height information to be degraded or lost altogether. Therefore, what is also needed is an approach to selecting and/or optimizing off-axis illumination parameters for an object of interest.

The invention can include a method for improving the holographic imaging of DDH systems that employ off-axis illumination. This method can be implemented in software. This method can include the selection of off-axis illumination parameters as a function of the content of the object being observed. This method can improve both the spatial and height resolution of a direct-to-digital holography (DDH) imaging system using off-axis illumination, in a manner dependent upon the content of a given object of interest. Improved resolution is achieved through digital processing of multiple deterministically selected holograms of the given object captured under varying illumination angles. Therefore, the invention can address the need for the off-axis illumination parameters to be determined by the content of the object being observed.

The selection of off-axis illumination parameters can be iterative. Additional off-axis illumination images can be fused into a composite image. The additional (off-axis) illumination images can be compiled and fused into the composite image as a set, one at a time, or as sets.

The selection of off-axis illumination parameters can be genetic. Multiple composite images can be compiled and compared. As between two or more composite images, one or more illumination parameters used to obtain the fused image with the best resolution can be used as guide points (e.g., end points) for the further optimization of those parameters in subsequent iterations. Alternatively, as between two or more composite images, one or more illumination parameters used to obtain the fused image with the worst resolution can be avoided during subsequent iterations.

This method can include the following procedures. A holographic imaging system with computer-controlled object illumination forms a hologram of the observed object. A digital representation of the hologram is transferred to a computer and a digital representation of the object wave (i.e., the image) is reconstructed and stored. Features of interest can be identified either by a user or by automatic processing. Guidance toward features of interest can be provided by data which indicates a variation of amplitude and/or phase across two or more adjacent pixels. A rapid variation of amplitude and/or phase across two or more adjacent pixels is highly indicative of a feature of interest.

An improved resolution composite image is computed by fusing the current image with one, or more, previous images. The composite image and the features of interest are analyzed; the results of this analysis will either terminate the process or provide new imaging control parameters. These control parameters, which indicate the next illumination angle from which to capture a new image, can be passed to the holographic imaging system. This process can be repeated. In this way, the invention can improve holographic imaging capabilities by allowing off-axis illumination to adapt to the characteristics of the observed object.

Figure 4:
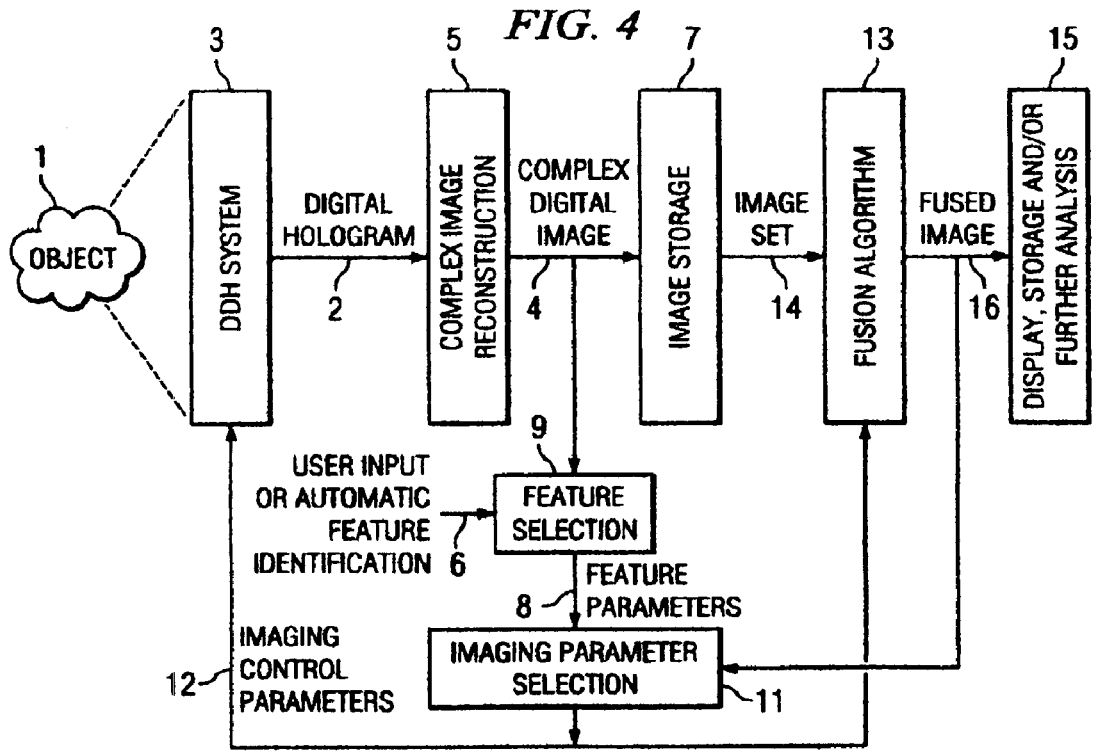
FIG. 4 illustrates a flow diagram of a process that can be implemented by a computer program, representing an embodiment of the invention.

Referring to FIG. 4, an overview diagram of the invention is shown. Physical components of the invention can include an object 1, an off-axis illumination direct to digital holography (DDH) system 3, and a computer for display, storage and/or further analysis 15. The remainder of the invention can include software. The object 1 of interest is imaged by the off-axis illumination DDH System 3. The off-axis illumination DDH system 3 can be the system depicted in FIGS. 2 and 3.

Referring again to FIG. 4, the output of the DDH System 3 is a digital hologram 2 which is then passed to a complex image reconstruction stage 5 where a complex digital image 4 of the observed object 1 is computed. In one embodiment, the complex image reconstruction stage 5 can employ Fourier domain image reconstruction, which is now well known to those skilled in the art. It is important to note that amplitude of the complex digital image (4) indicates the reflectivity of the object 1 while the phase of the complex digital image 4 indicates the height of the object 1.

Still referring to FIG. 4, the complex digital image 4 is then passed to both an image storage stage 7 and a feature selection stage 9. The image storage stage 7 collects into one, or more, image set(s) 14 all of the images captured for the object 1. To form a composite image, the image storage stage 7 passes one, or more of, the image set(s) 14 and the associated parameters 12 to the fusion algorithm 13. The fusion algorithm 13 uses one or more of the passed image set(s) 14, along with all, or some, of the associated imaging control parameters 12 used to capture the images in the set(s), to compute a higher resolution, composite fused image 16. In one embodiment, the fusion algorithm 13 can construct the composite fused image 16 using the Fourier domain approach described in relation to FIGS. 2 and 3.

Referring again to FIG. 4, the fused image 16 can be passed to an imaging parameter selection stage 11 as well as the display, storage, and/or further analysis stage 15. The feature selection 9 stage takes as input the complex digital image 4 and user input or automatic feature identification 6. The purpose of the feature selection stage 9 is to identify a feature or feature(s) of interest in the observed object 1. Such features may be identified by a user through a graphical user interface or by automatic image processing. The feature selection stage 9 then passes the feature parameters 8 to the imaging parameter selection stage 11. The imaging parameter selection stage 11 takes as input the feature parameters 8 and the current fused image 16. By analyzing the current fused image 16 with respect to the feature parameters 8, the imaging parameter selection stage 11 can determine whether processing should be stopped—in the case that the fused image 16 is deemed to be good enough—or instead whether to output a new set of imaging control parameters 12. New imaging control parameters 12 can instruct the DDH system 2 to capture a new hologram using the off-axis illumination angle specified by the imaging control parameters 12. Once a new digital hologram 2 is captured, the above process is repeated until image parameter selection 11 stage determines that processing should be stopped.

The disclosed embodiments show a computer controlled, moveable enclosure as the structure for performing the function of aligning the source, beam expander/spatial filter and lens so that the object beam passes through the object objective on-center or off-center, but the structure for aligning the source, beam expander/spatial filter and lens can be any other structure capable of performing the function of aligning the object beam so that it passes through the object objective on-center or off-center, including, by way of example a moveable platform for displacing the beamsplitter, the mirror, the object objective, the object, the focusing lens and the CCD camera relative to the source, beam expander/spatial filter and lens, or as another example, a series of movable optical elements (e.g., mirrors), or as another example a flexible optical fiber and/or cable.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term approximately, as used herein, is defined as at least close to a given value (e.g., preferably within 10% of, more preferably within 1% of, and most preferably within 0.1% of). The term substantially, as used herein, is defined as largely but not necessarily wholly that which is specified. The term generally, as used herein, is defined as at least approaching a given state. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer or computer system. The phrase low-frequency, as used herein, can be defined as implying that the fundamental fringe spatial frequency is below the Nyquist sampling limit.

Practical Applications of the Invention

A practical application of the invention that has value within the technological arts is metrology. The invention is useful in conjunction with microelectronic (mechanical) fabrication, such as for semiconductor inspection. The invention is also useful in conjunction with nanotechnology research, development and manufacturing, such as nanovisualization, nanomeasurement, or the like. The invention is useful in the context of an interferometer using digital processing and/or a digital data acquisition, for example, a direct-to-digital holography tool based on electron holography. There are virtually innumerable uses for the invention, all of which need not be detailed here.

Advantages of the Invention

A method, apparatus and/or computer program, representing an embodiment of the invention, can be cost effective and advantageous for at least the following reasons. The invention can provide identification of interesting features in the observed object, either automatically or by user input through a graphical user interface. The invention can provide control of holographic imaging system based upon the identified features to provide content-based resolution improvement. The invention can provide a feedback path where the current fused image is analyzed to decide whether processing should stop or to compute the best imaging parameters to capture a new hologram. The invention can provide computer-control of object illumination. The invention can provide fusion of results from multiple holograms. The invention can provide significantly increased imaging resolution. The invention improves quality and/or reduces costs compared to previous approaches.

All the disclosed embodiments of the invention disclosed herein can be made and used without undue experimentation in light of the disclosure. The invention is not limited by theoretical statements recited herein. Although the best mode of carrying out the invention contemplated by the inventor is disclosed, practice of the invention is not limited thereto. Accordingly, it will be appreciated by those skilled in the art that the invention may be practiced otherwise than as specifically described herein.

Further, the individual components need not be combined in the disclosed configurations, but could be combined in virtually all configurations. Further, variation may be made in the steps or in the sequence of steps composing methods described herein. Further, although the apparatus described herein can be a separate module, it will be manifest that the apparatus may be integrated into the system with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES (1) Goodman, Joseph W., "Introduction to Fourier Optics," McGraw-Hill, 1998.
(2) Voelkl, E. et al., "Introduction to Electron Holography," Kluwer Academics/Plenum Publishers, 1999.
(3) Eugene Hecht, "Optics, Third Edition," Addison-Wesley, 1998, page 465–469; 599–602.

What is claimed is:

1. A method of recording a content-based off-axis illuminated spatially heterodyne hologram including spatially heterodyne fringes for Fourier analysis, comprising:

calculating an illumination angle with respect to an optical axis defined by a focusing lens as a function of data representing a Fourier analyzed spatially heterodyne hologram;

reflecting a reference beam from a reference mirror at a non-normal angle;

reflecting an object beam from an object, the object beam incident upon the object at the illumination angle;

focusing the reference beam and the object beam at a focal plane of a digital recorder to form the content-based off-axis illuminated spatially heterodyne hologram including spatially heterodyne fringes for Fourier analysis; and digitally recording the content based off-axis illuminated spatially heterodyne hologram including spatially heterodyne fringes for Fourier analysis.

2. The method of claim 1, further comprising:

Fourier analyzing the recorded content based off-axis illuminated spatially heterodyne hologram including spatially heterodyne fringes by transforming axes of the recorded content based off-axis illuminated spatially heterodyne hologram including spatially heterodyne fringes in Fourier space to sit on top of a heterodyne carrier frequency defined as an angle between the reference beam and the object beam;

applying a digital filter to cut off signals around an original origin; and then performing an inverse Fourier transform.

3. The method of claim 1, further comprising fusing the Fourier analyzed content based off-axis illuminated spatially heterodyne hologram with at least one Fourier analyzed spatially heterodyne hologram to compute a single composite image.

4. The method of claim 3, wherein the Fourier analyzed spatially heterodyne hologram includes a composite image.

5. The method of claim 3, further comprising replaying the single composite image.

6. The method of claim 3, further comprising transmitting the single composite image.

7. The method of claim 1, wherein calculating the illumination angle with respect to the optical axis defined by the focusing lens as the function of data representing the Fourier analyzed spatially heterodyne hologram includes selecting a feature of interest from the Fourier analyzed spatially heterodyne hologram.

8. The method of claim 7, wherein the step of digitally recording includes detecting the beams with a CCD camera that defines pixels.

9. The method of claim 8, wherein the feature of interest is defined by data that indicates a variation in at least one member selected from the group consisting of amplitude and phase across at least two pixels.

10. The method of claim 1, further comprising determining whether to record another content based spatially heterodyne hologram.

11. The method of claim 10, further comprising recording the another content based spatially heterodyne hologram.

12. The method of claim 11, further comprising:
Fourier analyzing the recorded another content based spatially heterodyne hologram including spatially heterodyne fringes by transforming axes of the another recorded content based spatially heterodyne hologram including spatially heterodyne fringes in Fourier space to sit on top of a heterodyne carrier frequency defined as an angle between the reference beam and the object beam;
applying a digital filter around an original origin; and then
performing an inverse Fourier transform.

13. The method of claim 12 further comprising fusing the Fourier analyzed another content based spatially heterodyne hologram with at least one Fourier analyzed spatially heterodyne hologram to compute a single composite image.

14. The method of claim 1 further comprising storing the content based spatially heterodyne hologram including spatially heterodyne fringes for Fourier analysis as digital data.

15. An apparatus operable to digitally record a content-based off-axis illuminated spatially heterodyne hologram including spatially heterodyne fringes for Fourier analysis, comprising:
an illumination source;
a beamsplitter optically coupled to the illumination source;
a reference beam mirror optically coupled to the beamsplitter;
a focusing lens;
a digital recorder coupled to the focusing lens; and
a computer that controls an illumination angle with respect to an optical axis defined by the focusing lens as a function of data representing a Fourier analyzed spatially heterodyne hologram, performs a Fourier transform, applies a digital filter, and performs an inverse Fourier transform,
wherein a reference beam is incident upon the reference beam mirror at a non-normal angle, an object beam is incident upon an object at an angle with respect to an optical axis defined by the focusing lens, the reference beam and the object beam are focused by the focusing lens at a focal plane of the digital recorder to form the content-based off-axis illuminated spatially heterodyne hologram including spatially heterodyne fringes for Fourier analysis which are recorded by the digital recorder, and the computer transforms axes of the recorded off-axis illuminated spatially heterodyne hologram including spatially heterodyne fringes in Fourier space to sit on top of a heterodyne carrier frequency defined by an angle between the reference beam and the object beam and cuts off signals around an original origin before performing the inverse Fourier transform.

16. The apparatus of claim 15, further comprising an object objective optically coupled between the beamsplitter and the object.

17. The apparatus of claim 15, wherein the illumination source includes a laser.

18. The apparatus of claim 15, wherein the digital recorder includes a CCD camera that defines pixels.

19. The apparatus of claim 15, wherein the angle between the reference beam and the object beam, and a magnification provided by the focusing lens, are selected in order that the digital recorder may resolve features of the off-axis illuminated spatially heterodyne hologram including spatially heterodyne fringes for Fourier analysis and two fringes, each having two pixels per fringe, are provided.

20. The apparatus of claim 15, wherein the illumination source is moveable relative to the beamsplitter.

21. The apparatus of claim 15, wherein the beamsplitter, the reference beam mirror and the digital recorder define a Michelson geometry.

22. The apparatus of claim 15, wherein the beamsplitter, the reference beam mirror and the digital recorder define a Mach-Zehner geometry.

23. The apparatus of claim 15, further comprising a digital storage medium coupled to the computer for performing a Fourier transform, applying a digital filter, and performing an inverse Fourier transform.

24. The apparatus of claim 15, wherein the computer calculates the illumination angle with respect to the optical axis defined by the focusing lens as the function of data representing the Fourier analyzed spatially heterodyne hologram.

* * * * *